US012360928B2

United States Patent
Terashima et al.

(10) Patent No.: US 12,360,928 B2
(45) Date of Patent: Jul. 15, 2025

(54) SEMICONDUCTOR DEVICE

(71) Applicant: RENESAS ELECTRONICS CORPORATION, Tokyo (JP)

(72) Inventors: Kazuaki Terashima, Tokyo (JP); Atsushi Nakamura, Tokyo (JP); Rajesh Ghimire, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 205 days.

(21) Appl. No.: 18/348,534

(22) Filed: Jul. 7, 2023

(65) Prior Publication Data

US 2024/0104034 A1    Mar. 28, 2024

(30) Foreign Application Priority Data

Sep. 27, 2022 (JP) .................. 2022-154238

(51) Int. Cl.
*G06F 13/28* (2006.01)
*G06T 1/20* (2006.01)
*G06T 1/60* (2006.01)

(52) U.S. Cl.
CPC ................ *G06F 13/28* (2013.01); *G06T 1/20* (2013.01); *G06T 1/60* (2013.01)

(58) Field of Classification Search
CPC .. G06F 13/28; G06T 1/20; G06T 1/60; G06N 3/02; G06N 3/0464
USPC ....................................................... 345/532
See application file for complete search history.

(56) References Cited

U.S. PATENT DOCUMENTS

| 10,996,877 B2 | 5/2021 | Sasamoto et al. | |
| 2022/0374691 A1* | 11/2022 | Bae | G06N 3/063 |
| 2023/0008138 A1* | 1/2023 | Mombers | G06N 20/00 |

FOREIGN PATENT DOCUMENTS

JP    2019-207458 A    12/2019

* cited by examiner

Primary Examiner — Jacinta M Crawford
(74) Attorney, Agent, or Firm — Rimon P.C.

(57) ABSTRACT

A second memory has n banks accessible in parallel, and stores pixel data. An input DMA controller respectively transfers the pixel data stored in the second memory to n multiply-accumulate units by using n input channels. A sequence controller controls the input DMA controller so as to cause a first input channel to transfer the pixel data in a first pixel space of the input bank to a first multiply-accumulate unit and cause a second input channel to transfer the pixel data in a second pixel space of the same input bank to a second multiply-accumulate unit.

10 Claims, 8 Drawing Sheets

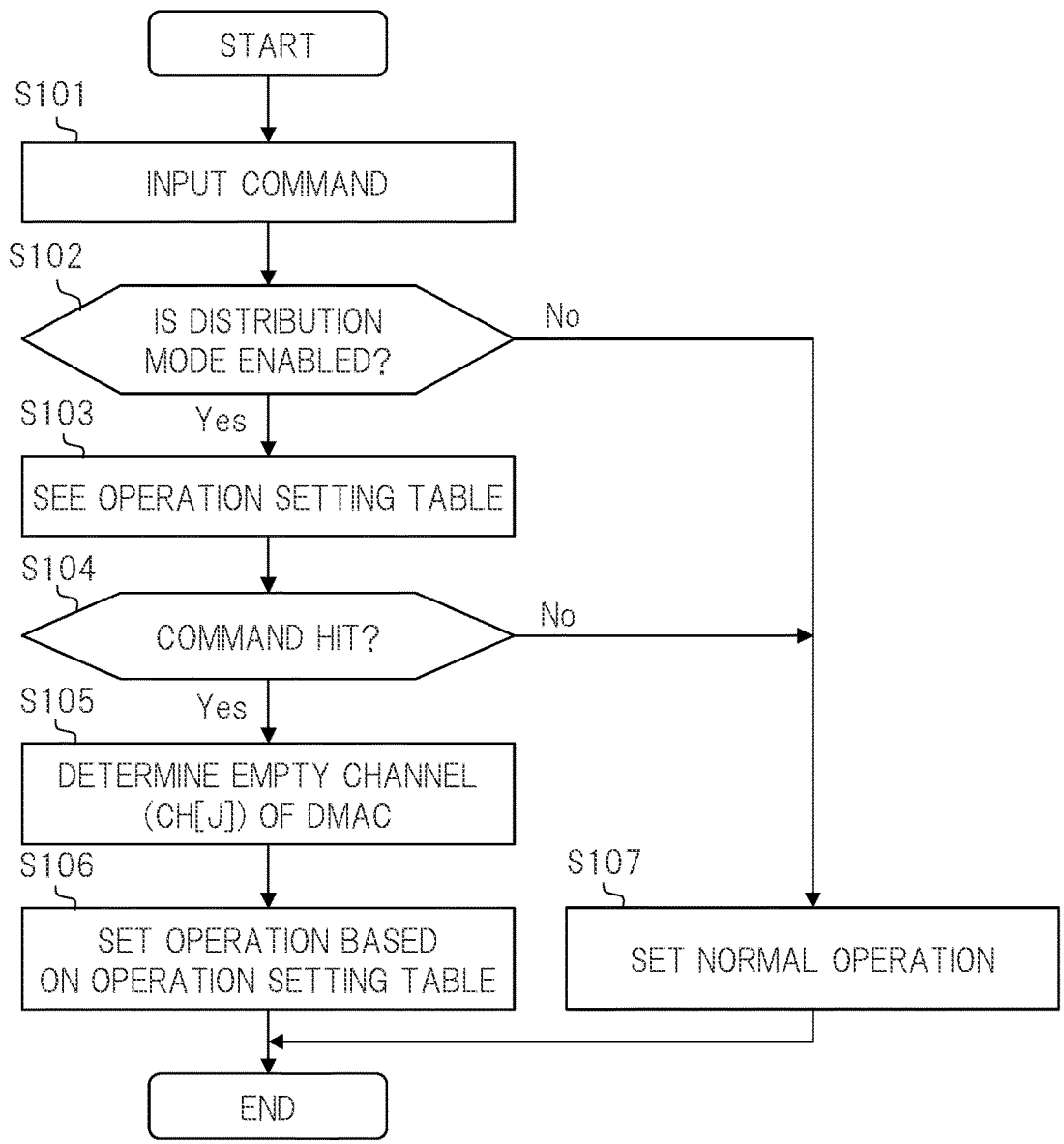

SEMICONDUCTOR DEVICE

CROSS-REFERENCE TO RELATED APPLICATIONS

The present application claims priority from Japanese Patent Application No. 2022-154238 filed on Sep. 27, 2022, the content of which is hereby incorporated by reference to this application.

BACKGROUND

The present invention relates to a semiconductor device, for example, a semiconductor device that performs a processing of a neural network.

Patent Document 1 (Japanese Patent Application Laid-open No. 2019-207458) shows a method of performing operations on a plurality of intermediate layers, which configure a convolutional neural network, by using a memory having a plurality of banks. In this method, allocations of the banks to be storage sources of input data or storage destinations of output data are appropriately determined based on a transfer amount and a transfer rate required for the input data and the output data for each of the plurality of intermediate layers.

SUMMARY

For example, in a processing of a neural network such as CNN (Convolutional Neural Network), a large amount of arithmetic processings is performed by using a plurality of DMA (Direct Memory Access) controllers and a plurality of multiply-accumulate units, etc. mounted on a semiconductor device. Specifically, the DMA controller causes the multiply-accumulate unit to perform multiply-accumulate operations by transferring pixel data and weight parameters of a certain convolutional layer, which are stored in a memory, to the multiply-accumulate unit. Also, the DMA controller transfers, as pixel data of the next convolutional layer, an operation result(s) by the multiply-accumulate unit to the memory. A semiconductor device repeatedly performs such processings.

In order to flexibly handle various configurations of the neural networks, such a semiconductor device often operates based on simple commands. For example, as disclosed in Patent Document 1, recited are commands for specifying a memory bank that is the storage source of the input data and a memory bank that is the storage destination of the output data. However, when the plurality of multiply-accumulate units are caused to perform the multiply-accumulate operations based on such commands, the plurality of multiply-accumulate units may not always be used efficiently. As a result, a processing time of the neural network may increase more than expected.

Embodiments described later have been made in view of the above, and other problems and novel features will become apparent from the description of this specification and the accompanying drawings.

A semiconductor device according to one embodiment includes a memory, n multiply-accumulate units, an input DMA controller, an output DMA controller, and a sequence controller, where n is an integer of 2 or more. The memory has n banks accessible in parallel, and stores pixel data. Each of the n multiply-accumulate units performs multiply-accumulate operations on a plurality of pieces of pixel data and a plurality of weight parameters. The input DMA controller transfers the pixel data stored in the memory to each of the n multiply-accumulate units by using n input channels. The output DMA controller transfers the pixel data from the n multiply-accumulate units to the memory by using n output channels, respectively. The sequence controller controls the input DMA controller so as to cause the first input channel to transfer the pixel data in a first pixel space of the input bank to the first multiply-accumulate unit and causes the second input channel to transfer the pixel data in a second pixel space of the same input bank to the second multiply-accumulate unit.

Using the semiconductor device of one embodiment makes it possible to shorten the processing time of the neural network.

BRIEF DESCRIPTION OF THE DRAWINGS

FIG. 7 is a schematic diagram showing a configuration example of an operation setting table in FIG. 6.

FIG. 8 is a flowchart showing an operation example of a sequence controller in FIG. 6.

DETAILED DESCRIPTION

Figure 1:
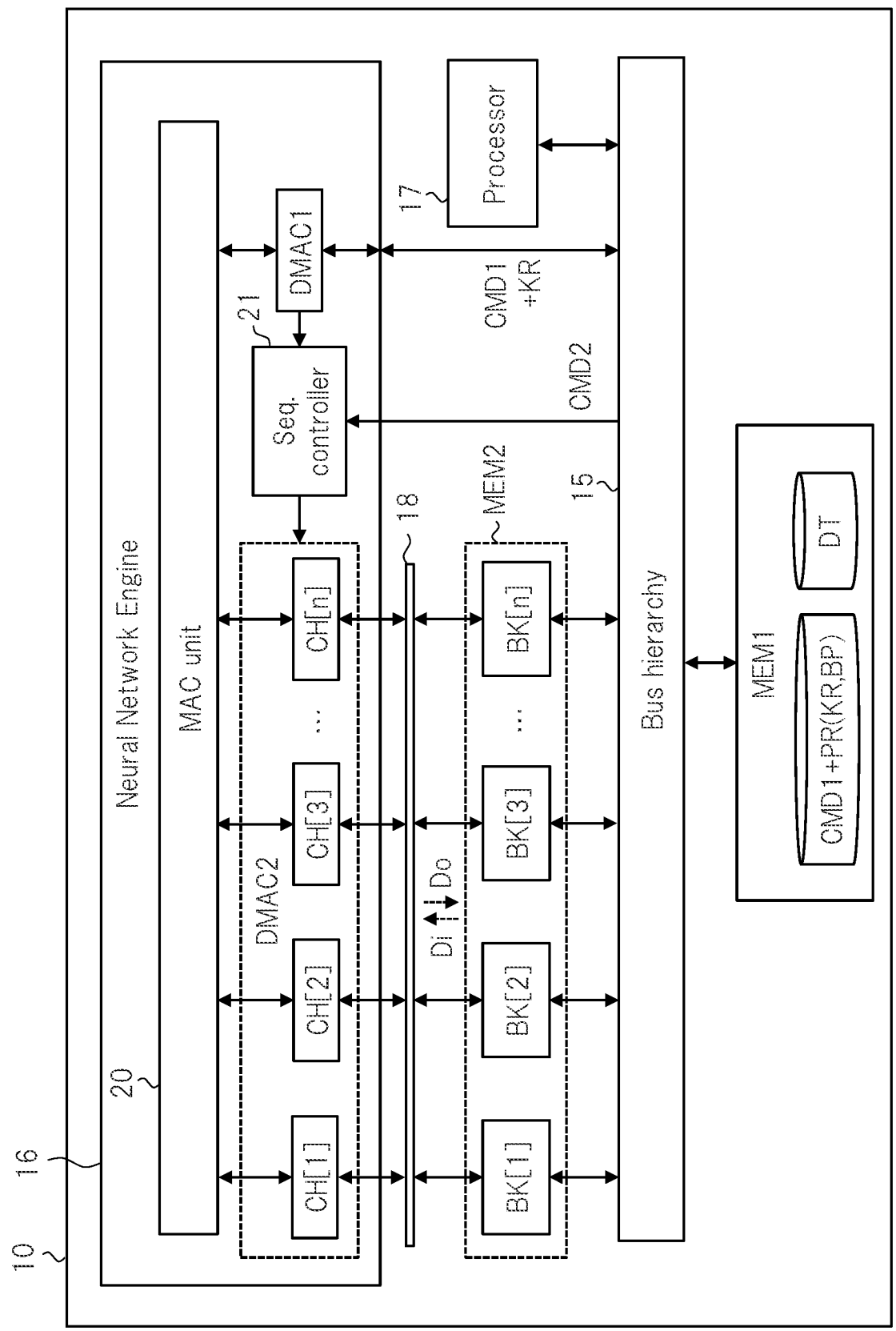
FIG. 1 is a schematic diagram showing a configuration example of a main part in a semiconductor device according to a first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted. In addition, the description of the same or similar portions is not repeated in principle unless particularly required in the following embodiments.

First Embodiment

<Outline of Semiconductor Device>

FIG. 1 is a schematic diagram showing a configuration example of a main part in a semiconductor device according to a first embodiment. A semiconductor device 10 shown in FIG. 1 is, for example, a SoC (System on Chip) or the like configured by one semiconductor chip. The semiconductor device 10 is typically mounted in a vehicle ECU (Electronic Control Unit) or the like, and provides ADAS (Advanced Driver Assistance System) functions. The semiconductor device 10 includes a system bus 15, a neural network engine 16, a processor 17, memories MEM1, MEM2, and a memory bus 18.

The processor 17 is a CPU (Central Processing Unit), a DSP (Digital Signal Processor), or the like. A system bus connects the neural network engine 16, the memories MEM1, MEM2, and the processor 17 to each other. The neural network engine 16 performs a processing of the neural network represented by a CNN. The processor 17 causes the semiconductor device 10 to perform predetermined functions including control of the neural network engine 16, for example, by executing a predetermined program stored in the memory MEM1.

The memory MEM1 is a DRAM (Dynamic Random Access Memory) or the like, and the memory MEM2 is a cache SRAM (Static Random Access Memory) or the like. The memory MEM1 stores, for example, image data DT composed of a plurality of pieces of pixel data, a command CMD1, and a parameter PR. The parameter PR includes a kernel KR composed by a plurality of weight parameters, and a bias parameter BP. The command CMD1 is a command for controlling an operation of neural network engine 16.

The memory MEM2 is used as a high-speed cache memory for the neural network engine 16. The memory MEM2 has n banks BK[1] to BK[n] which can be accessed in parallel, where n is an integer of 2 or more. The memory MEM2 stores pixel data Di to the neural network engine 16, and pixel data Do from the neural network engine 16.

For example, the image data DT in the memory MEM1, that is, pixel data is copied in advance to the predetermined banks BK[1] to BK[n] in the memory MEM2 via the system bus 15, and then used by the neural network engine 16. The memory bus 18 connects the neural network engine 16 and the memory MEM2. The memory bus 18 is, for example, an AXI (Advanced eXtensible Interface) bus or the like that enables parallel access to the n banks BK[1] to BK[n] by a crossbar switch or the like.

The neural network engine 16 includes a plurality of DMA controllers DMAC1, DMAC2, a MAC unit 20, and a sequence controller 21. The MAC unit 20 includes n multiply-accumulate units, details of which will be described later. The DMA controller DMAC1 controls data transfer between the memory MEM1 and the MAC unit 20 via the system bus 15. Particularly, the DMA controller DMAC1 transfers the kernel KR stored in the memory MEM1, that is, the weight parameter and the like to the MAC unit 20. Also, the DMA controller DMAC1 transfers the command CMD1 stored in the memory MEM1 to the sequence controller 21.

The DMA controller DMAC2 controls data transfer between the memory MEM2 and the MAC unit 20 via the memory bus 18. Particularly, the DMA controller DMAC2 transfers the pixel data Di stored in the memory MEM2 to the MAC unit 20 by using n channels CH[1] to CH[n]. Consequently, the MAC unit 20 performs a multiply-accumulate operation between the kernel KR from the DMA controller DMAC1 and the pixel data Di from the DMA controller DMAC2. Further, although details thereof are omitted, the MAC unit 20 may add a bias parameter BP to a multiply-accumulate operation result, perform an activation function operation on an addition result thereof, or the like.

Through such calculations, the MAC unit 20 generates pixel data Do serving as each piece of feature data in a feature map. The DMA controller DMAC2 transfers the pixel data Do from the MAC unit 20 to the memory MEM2 by using the n channels CH[1] to CH[n]. According to this, the pixel data Do written in the MEM2 becomes pixel data Di inputted to the MAC unit 20 in the next convolutional layer.

The sequence controller 21 controls an operation sequence etc. of the neural network engine 16 based on the command CMD1 from the DMA controller DMAC1 or the command CMD2 inputted from the processor 17 via the system bus 15. As one of them, the sequence controller 21 controls the DMA controller DMAC2.

<Details of Neural Network Engine>

Figure 2:
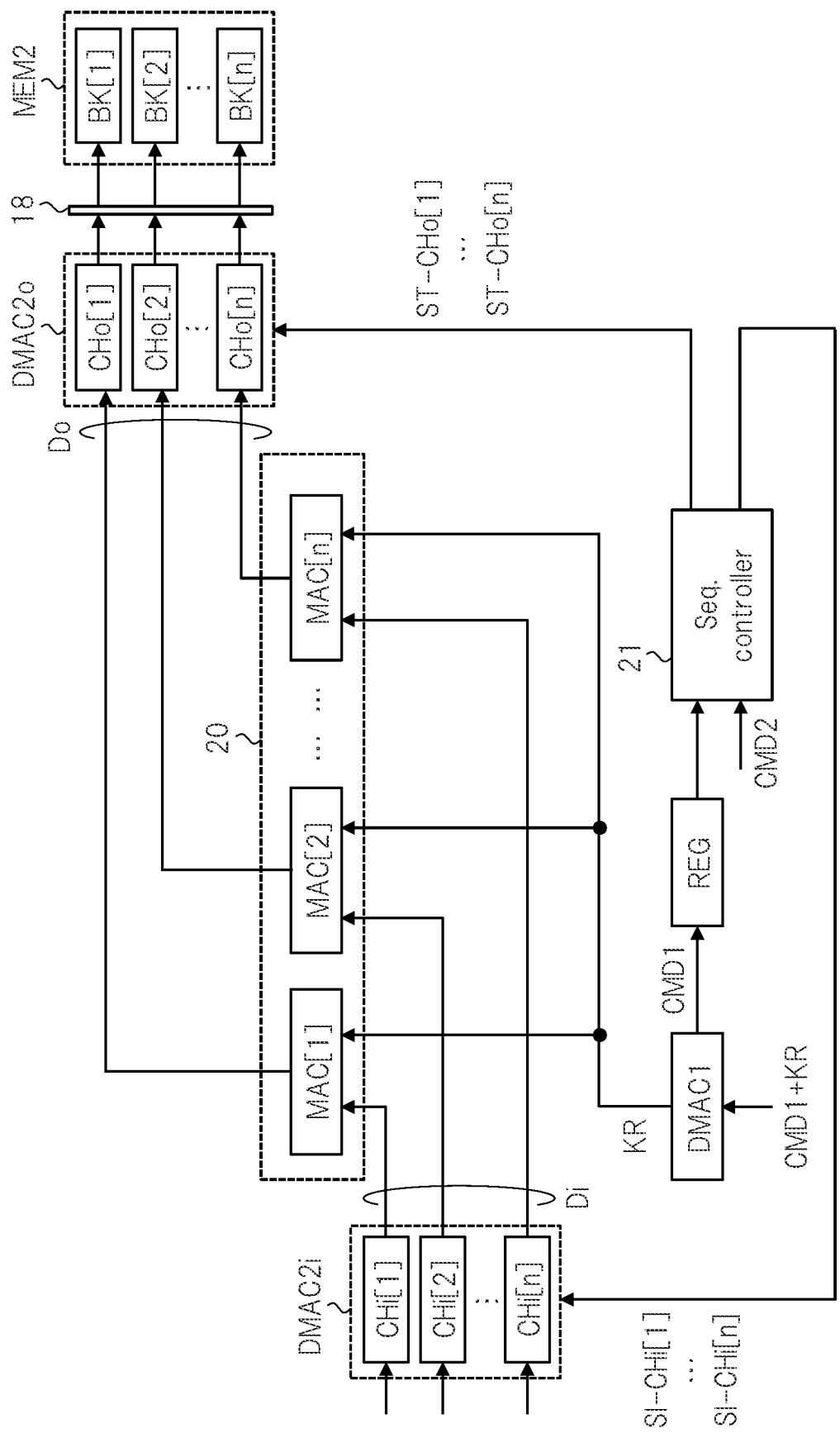
FIG. 2 is a diagram showing a detailed configuration example of a neural network engine in FIG. 1.

FIG. 2 is a diagram showing a detailed configuration example of the neural network engine in FIG. 1. In FIG. 2, the MAC unit 20 includes n multiply-accumulate units MAC[1] to MAC[n]. The DMA controller DMAC1 reads information containing the command CMD1 and the kernel KR from the memory MEM1. The DMA controller DMAC1 transfers the read kernel KR to at least one of the n multiply-accumulate units MAC[1] to MAC[n], and writes the read command CMD1 to a register REG. At this time, set in the DMA controller DMAC1 are an address range of the memory MEM1, which is a transfer source, and the multiply-accumulate units MAC[1] to MAC[n], which are transfer destinations, particularly, addresses of respective input registers.

The DMA controller DMAC2 shown in FIG. 1 has, particularly, an input DMA controller DMAC2i and an output DMA controller DMAC2o, as shown in FIG. 2. The input DMA controller DMAC2i has n input channels CHi[1] to CHi[n], and the output DMA controller DMAC2o has n output channels CHo[1] to CHo[n].

The input DMA controller DMAC2i uses the n input channels CHi[1] to CHi[n] to respectively transfer the pixel data Di stored in the memory MEM2 to the n multiply-accumulate units MAC[1] to MAC[n]. That is, if m is any integer from 1 to n, the transfer destination of the input channel CHi[m] is determined by the multiply-accumulate unit MAC[m], particularly, its input register. The multiply-accumulate unit MAC[m] performs the multiply-accumulate operation on the plurality of pieces of pixel data Di transferred by using the input channel CHi[m], and the kernel KR transferred by using the DMA controller DMAC1, particularly, the plurality of weight parameters configuring the kernel KR.

The output DMA controller DMAC2o transfers the pixel data Do from the n multiply-accumulate units MAC[1] to MAC[n] to the memory MEM2 by using the n output channels CHo[1] to CHo[n], respectively. That is, as in a case of the input DMA controller DMAC2i, the transfer source of the output channel CHo[m] is determined by the multiply-accumulate unit MAC[m], particularly, its output register.

The sequence controller 21 controls the input DMA controller DMAC2i and the output DMA controller DMAC2o based on the command CMD1 written in the register REG or the command CMD2 from the processor 17. The commands CMD1, CMD2 specify, for example, an input bank (referred to as IBK) as a transfer source of the inputted pixel data Di, and an output bank (referred to as OBK) as a transfer destination of the outputted pixel data Do.

Based on the commands CMD1, CMD2, the sequence controller 21 sets the transfer source of the input channels CHi[1] to CHi[n], specifically, each of an input bank IBK and an address range in the input bank IBK by using setting signals ST-CHi[1] to ST-CHi[n]. Similarly, based on the commands CMD1, CMD2, the sequence controller 21 sets the transfer destinations of the output channels CHo[1] to CHo[n], specifically, each of the output bank OBK and an address range in the output bank OBK by using the setting signals ST-CHo[1] to ST-CHo[n].

<Configuration and Operation of Neural Network Engine (Comparative Example)>

Figure 9:
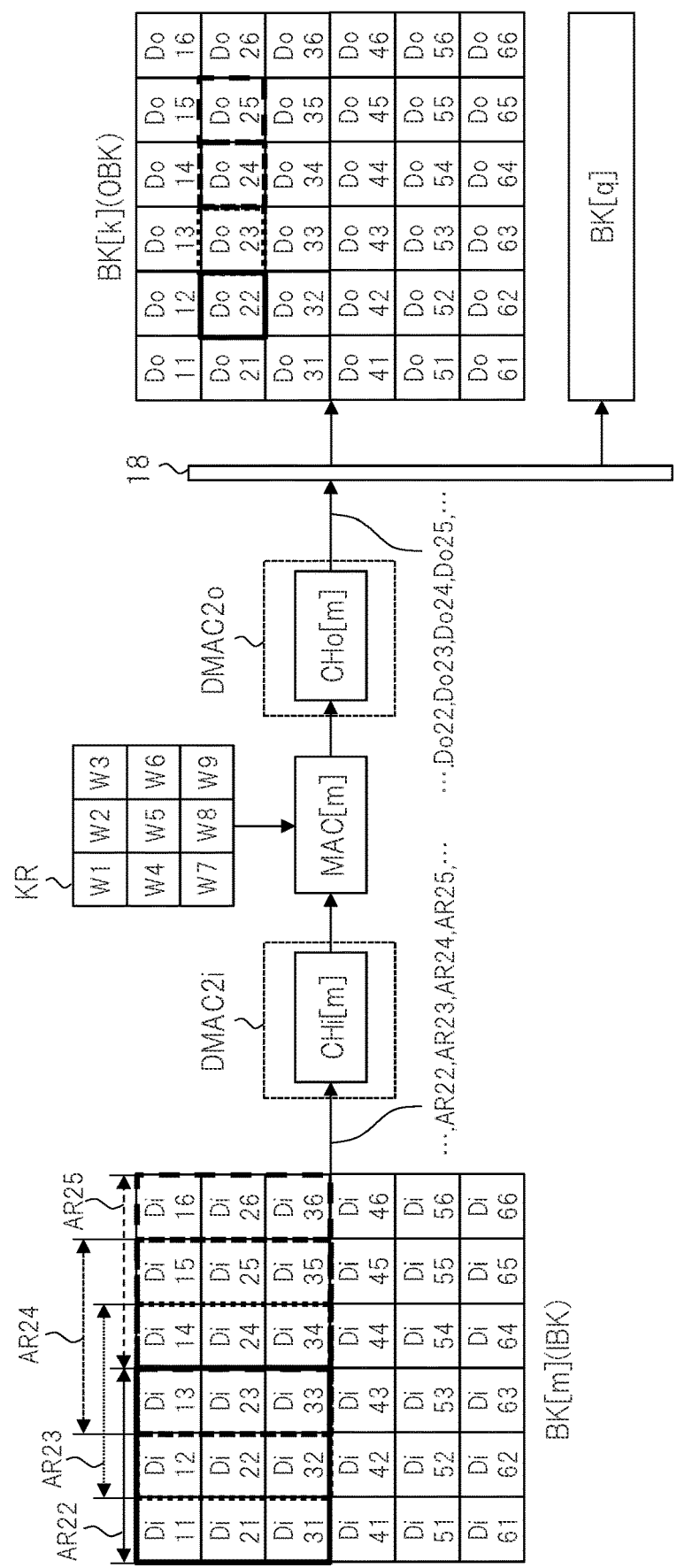
FIG. 9 is a diagram showing schematic configuration example and operation example of a neural network engine serving as a comparative example.

FIG. 9 is a diagram showing schematic configuration example and operation example of a neural network engine serving as a comparative example. In the neural network engine serving as a comparative example, as shown in FIG. 9, when a bank BK[m] to be an input bank IBK of the pixel data Di is determined, an input channel CHi[m], a multiply-accumulate unit MAC[m], and an output channel CHo[m] are uniquely defined. However, the input bank IBK and the output bank OBK need to be different. Therefore, the output channel CHo[m] can arbitrarily select the output bank OBK, that is, a bank of a transfer destination via the memory bus 18.

In an example of FIG. 9, the output bank OBK is defined as a bank BK[k], where k is any integer from 1 to n excluding m. Further, as described in Patent Document 1, when a data amount of pixel data Do is large, it is also possible to designate two banks BK[k] and BK[q] as the output bank OBK. In this case, the output channel CHo[m] writes the pixel data Do into the bank BK[k] and then writes the surplus pixel data Do into the bank BK[q].

Furthermore, even when a data transfer rate is required in the next convolutional layer, it is possible to designate the two banks BK[k], BK[q] as the output bank OBK. In this case, the output channel CHo[m] distributes and writes, for example, the pixel data Do to and in the two banks BK[k] and BK[q]. In the next convolutional layer, the two multiply-accumulate units MAC[k], MAC[q] use the two banks BK[k], BK[q] as the input bank IBK to perform the multiply-accumulate operation processings in parallel.

Also, FIG. 9 shows one example of specific processing contents when a 3×3 kernel KR is used in a certain convolutional layer. The kernel KR is composed of nine weight parameters W1 to W9. The bank BK[m], which is the input bank IBK, stores 6×6 pieces of pixel data Di1l to Di16, Di21 to Di26, . . . , Di61 to Di66 in this example. Here, "x" of the pixel data Dixy represents a row number, and "y" represents a column number.

The input channel CHi[m] reads, for example, a 3×3 pixel space AR22 in the bank BK[m], in other words, the pixel data Di11 to Di13, Di21 to Di23, and Di31 to Di33 contained in an address space, and transfers them to the multiply-accumulate unit MAC[m]. The pixel space AR22 is the 3×3 pixel space centered on the pixel data Di22. The multiply-accumulate unit MAC[m] performs the multiply-accumulate operations on nine pieces of pixel data Di contained in the pixel space AR22 and nine weight parameters W1 to W9 forming the kernel KR. The output channel CHo[m] writes the pixel data Do22, which is a multiply-accumulate operation result, to a predetermined position of the bank BK[k] which is the output bank OBK, that is, a predetermined address.

Subsequently, the input channel CHi[m] reads out the pixel data Di12 to Di14, Di22 to Di24, and Di32 to Di34 contained in the pixel space AR23 of the bank BK[m], and transfers them to the multiply-accumulate unit MAC[m]. The pixel space AR23 is a space obtained by sliding the pixel space AR23 once in a column direction, and is a 3×3 pixel space centered on the pixel data Di23. The multiply-accumulate unit MAC[m] performs a multiply-accumulate operation on the pixel data Di contained in the pixel space AR23 and the kernel KR. The output channel CHo[m] writes the pixel data Do23, which is the multiply-accumulate operation result, at a position adjacent to the pixel data Do22 in the column direction, that is, at an adjacent address in the bank BK[k].

Subsequently to this, a similar processing is performed on a pixel space AR24, which is a space obtained by sliding the pixel space AR23 once, and then a similar processing is performed on a pixel space AR25, which is a space obtained by sliding the pixel space AR23 once. As a result, the pixel data Do22 to Do25 are arranged alongside in order in the column direction.

When the above-described convolution operation processings are performed on the 6×6 pieces of pixel data Di in the bank BK[m] which is the input bank IBK, the 6×6 pieces of pixel data Do are stored in the bank BK[k], which is the output bank OBK, by arrangement as shown in FIG. 9. That is, the 6×6 pieces of pixel data Do11 to Do16, Do21 to Do26, . . . , Do61 to Do66 are arranged so as to mesh with the 6×6 pieces of pixel data Di in the input bank.

Incidentally, in this example, the 6×6 pieces of pixel data Do in the output bank OBK are generated by using padding. For example, in generating the pixel data Do11, a 3×3 pixel space centered on the pixel data Di1l is defined in the input bank IBK, and the nonexistent pixel data Di is padded with zeros, for example. Further, in the next convolution layer, for example, the pixel data Do of the bank BK[k] is used as the pixel data Di, that is, the bank BK[k] is used as the input bank IBK, and the same processings with a case of FIG. 9 are performed.

However, in such a system, the one input channel CHi[m] out of the n input channels, the multiply-accumulate unit MAC[m], and the output channel CHo[m] only operate, so that utilization efficiency of the neural network engine 16 can be deteriorated. As a result, the processing time of the neural network may increase.

<Configuration and Operation of Neural Network Engine (First Embodiment)>

Figure 3:
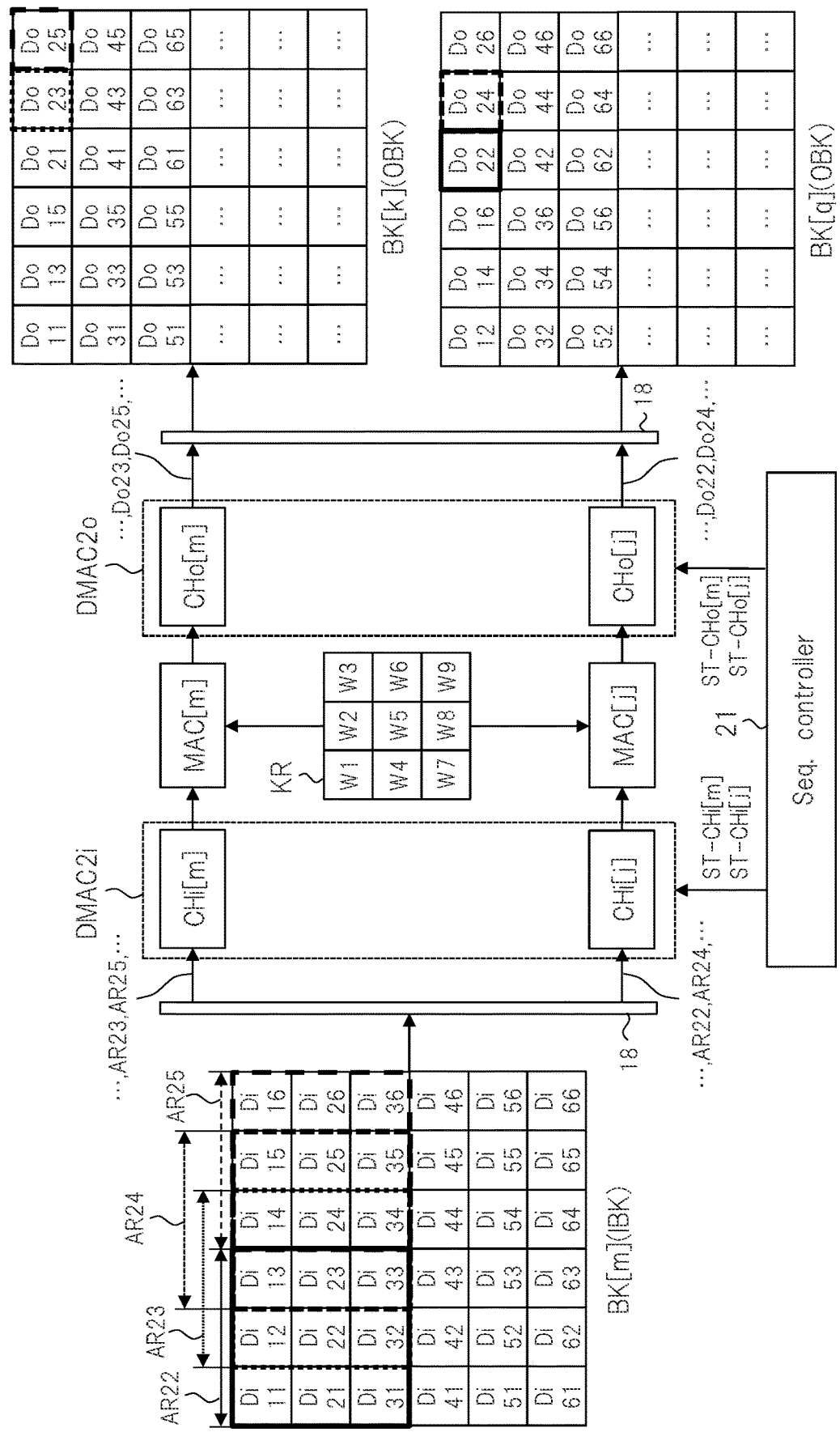
FIG. 3 is a diagram showing schematic configuration example and operation example of the neural network engine in FIGS. 1 and 2.

FIG. 3 is a diagram showing schematic configuration example and operation example of the neural network engine in FIGS. 1 and 2. In an example of FIG. 3, the sequence controller 21 causes the input channel CHi[m] to transfer the pixel data Di in the bank BK[m] which is the input bank IBK, for example, in the pixel space AR23 to the multiply-accumulate unit MAC[m]. Furthermore, in parallel with this, unlike a case of FIG. 9, the sequence controller 21 causes another input channel CHi[j] to transfer the pixel data Di in the next pixel space AR24 of the bank BK[m] to the multiply-accumulate unit MAC[j]. Incidentally, j is any integer from 1 to n excluding m.

The multiply-accumulate unit MAC[m] performs multiply-accumulate operations on the pixel data Di12 to Di14, Di22 to Di24, Di32 to Di34 in the pixel space AR23 from the input channel CHi[m] and the weight parameters W1 to W9 forming the kernel KR. In parallel with this, unlike the case of FIG. 9, the multiply-accumulate unit MAC[j] performs multiply-accumulate operations on the pixel data Di13 to Di15, Di23 to Di25, Di33 to Di35 in the pixel space AR24 from the input channel CHi[j] and the weight parameters W1 to W9 forming the kernel KR.

Then, the sequence controller 21 causes the output channel CHo[m] to transfer the pixel data Do23, which is targets the pixel space AR23 from the multiply-accumulate unit MAC[m], to the bank BK[k] which is the output bank OBK. Furthermore, in parallel with this, unlike the case of FIG. 9, the sequence controller 21 causes the output channel Cho[j] to transfer the pixel data Do24, which targets the pixel space R24 from the multiply-accumulate unit MAC[j], to the bank BK[q] which is another output bank OBK.

In this way, the sequence controller 21 controls the input DMA controller DMAC2$i$ so that the pixel data Di in the pixel space is distributed and transferred to the plurality of, here, the two multiply-accumulate units MAC[m], MAC[j] each time the pixel space is slid. As a specific example, the sequence controller 21 uses a setting signal ST-CHi[m] to set the input channel CHi[m] so as to be sequentially transferred every other step width from the unshown pixel space AR11 of the bank BK[m] to the unshown pixel space AR65. Similarly, the sequence controller 21 uses the setting signal ST-CHi[j] to set the input channel CHi[j] so as to be sequentially transferred every other step width from the unshown pixel space AR12 to the unshown pixel space AR66.

Consequently, the plurality of, here the two input channels CHi[m], CHi[j], the two multiply-accumulate units MAC[m], MAC[j], and the two output channels CHo[m], CHo[j] are parallelized and can be operated. As a result, the utilization efficiency of the neural network engine 16 can be enhanced, and the processing time of the neural network can be shortened.

Figure 4:
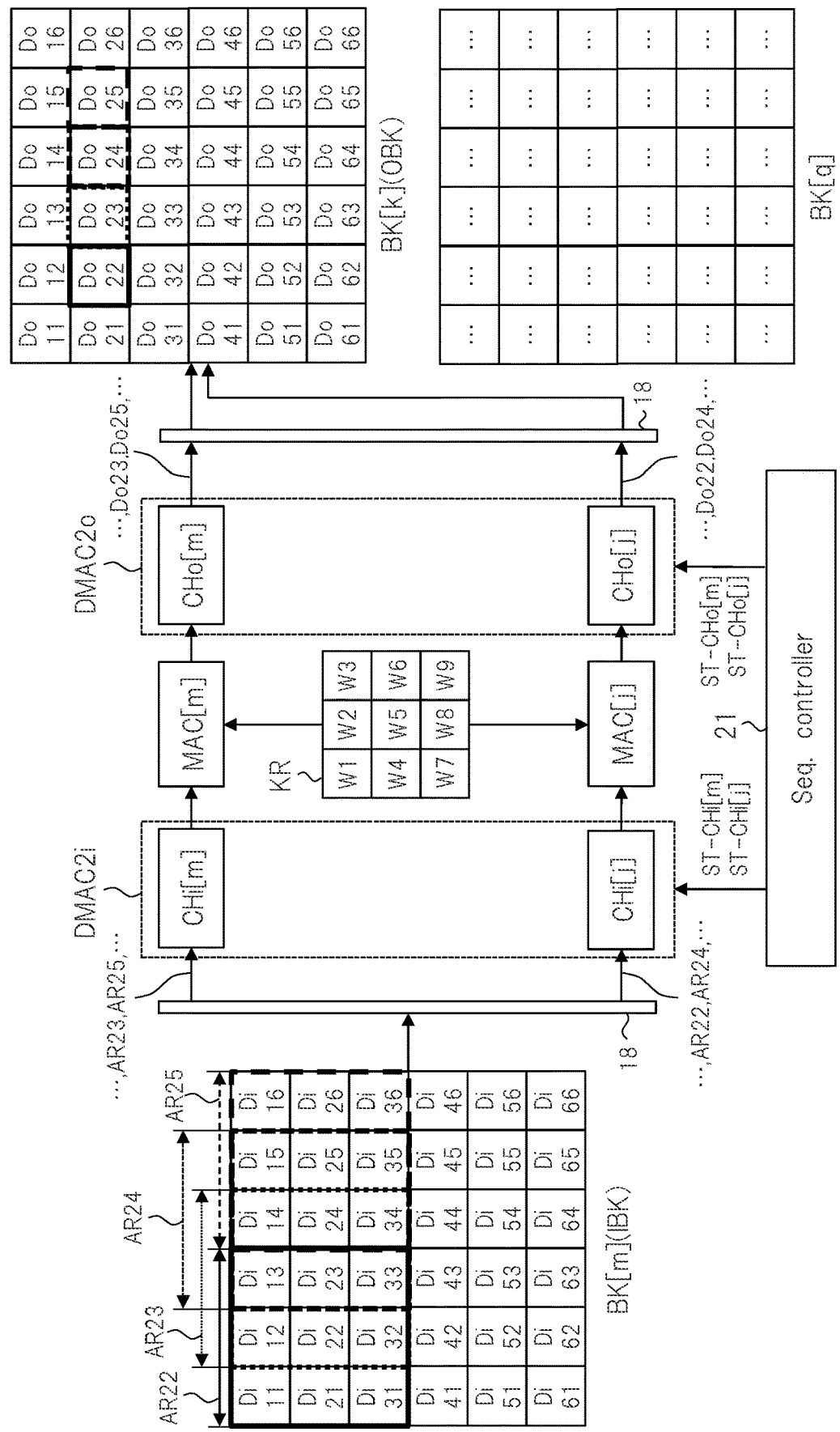
FIG. 4 is a diagram showing schematic configuration example and operation example of the neural network engine in FIGS. 1 and 2, which are different from a case of FIG. 3.

FIG. 4 is a diagram showing schematic configuration example and operation example of the neural network engine in FIGS. 1 and 2, which are different from those in FIG. 3. In FIG. 3, in the next convolution layer, for example, it is necessary to perform the multiply-accumulate operations by using a pixel space composed of the pixel data Do11 to Do13, Do21 to Do23, and Do31 to Do33. However, in a method shown in FIG. 3, the pixel data Do11 to Do13, Do21 to Do23, and Do31 to Do33 are distributed and written in the two banks BK[k], BK[q], which are the output banks OBK. Consequently, data reordering or the like can be required prior to a processing in the next convolutional layer.

Therefore, in FIG. 4, as in the case of FIG. 3, the sequence controller 21 causes the output channel Cho[m] to transfer the pixel data Do23, which targets the pixel space AR23 from the multiply-accumulate unit MAC[m], to the bank BK[k] which is the output bank OBK. In parallel with this, unlike the case of FIG. 3, the sequence controller 21 causes the output channel Cho[j] to transfer the pixel data Do24, which targets the pixel space AR24 from the multiply-accumulate unit MAC[j], to the bank BK[k] instead of the bank BK[q].

At this time, the sequence controller 21 controls the output DMA controller DMAC2$o$ so that the pixel data Do23 from the output channel CHo[m] and the pixel data Do24 from the output channel CHo[j] are arranged adjacent to each other in an address space of the bank BK[k]. As a specific example, it is assumed that a first address and a last address of the bank BK[k] are MA[1] and MA[x].

In this case, the sequence controller 21 uses the setting signal ST-CHo[m] to set the output channel CHo[m] so as to be sequentially transferred every other step width from MA[1] to CA[x−1]. Also, the sequence controller 21 uses the setting signal ST-CHo[j] to set the output channel CHo[j] so as to be sequentially transferred every other step width from #A[2] to #A[x].

Consequently, as shown in FIG. 4, by being arranged similarly to a case of the bank BK[m], which is the input bank IBK, in the bank BK[k] that is the output bank OBK, the pixel data Do11 to Do16, . . . , Do61 to Do66 can be written. This makes it unnecessary to rearrange data and the like and, as a result, makes it possible to further shorten the processing time of the neural network.

Figure 5:
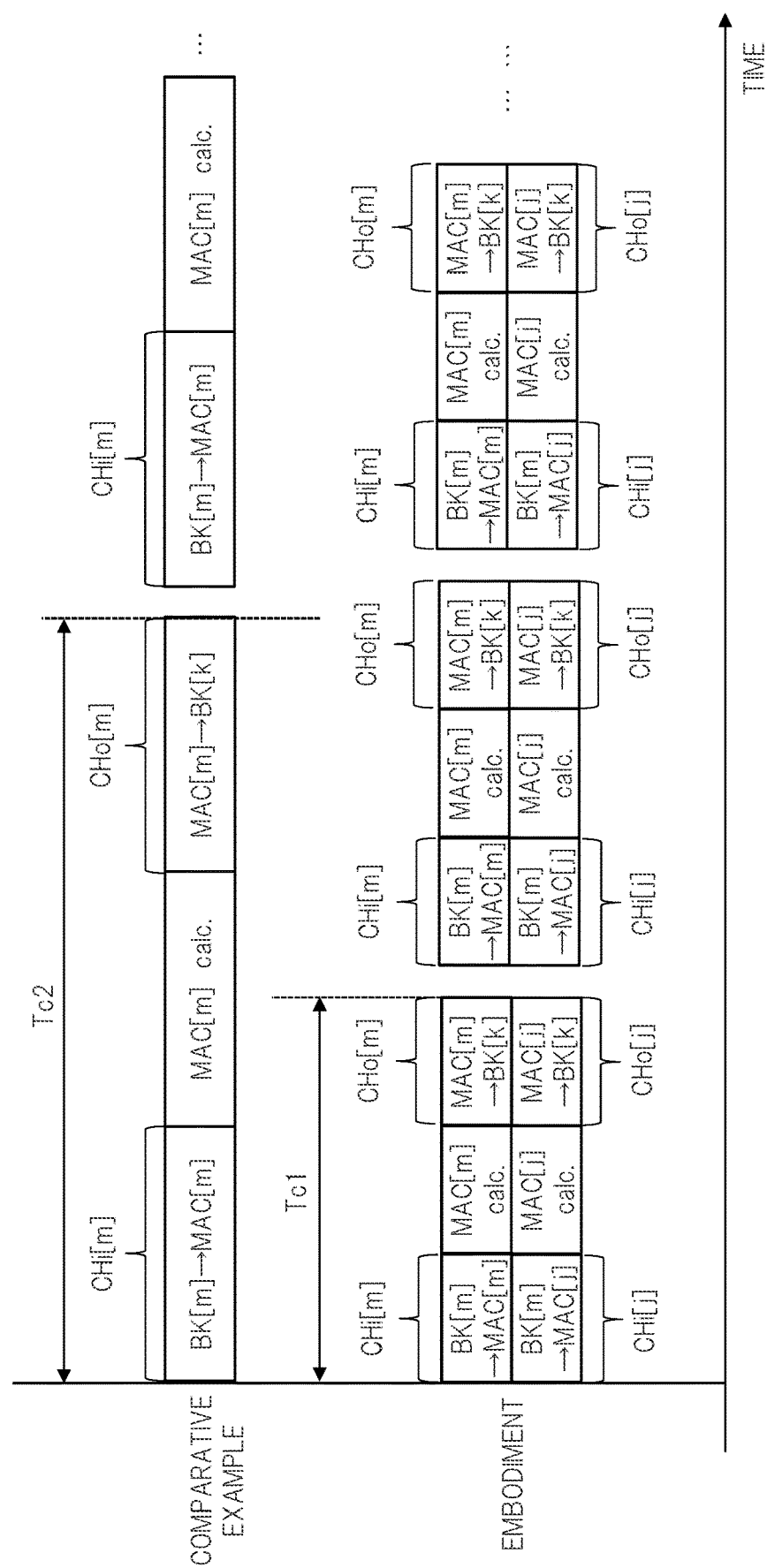
FIG. 5 is a timing chart showing one example that compares the operations of the neural network engine shown in FIG. 4 and the neural network engine shown in FIG. 9.

FIG. 5 is a timing chart showing one example for comparing the operations of the neural network engine shown in FIG. 4 and the neural network engine shown in FIG. 9. As shown in FIG. 5, in a method shown in FIG. 9, a series of processing cycles Tc2 using one input channel CHi[m], multiply-accumulate unit MAC[m], and output channel CHo[m] are executed repeatedly. Meanwhile, in a method shown in FIG. 4, a series of processing cycles Tc1 using two input channels CHi[m], CHi[j], multiply-accumulate units MAC[m], MAC[j], and output channels CHo[m], CHo[j] are executed repeatedly.

As a result, using the method shown in FIG. 4 makes it possible to shorten the processing time of the neural network in comparison with the case of using the method shown in FIG. 9 and, ideally, to be shortened about half. Incidentally, although a method of being distributed to the two multiply-accumulate units MAC[m], MAC[j] is shown here, it is also possible to be distributed to three or more multiply-accumulate units in the same way.

<Main Effects of First Embodiment>

As described above, in the method of the first embodiment, the input DMA controller DMAC2$i$ is controlled so that each pixel space in the one input bank IBK is distributed and processed by the plurality of multiply-accumulate units, which makes it possible to shorten the processing time of the neural network engine. Furthermore, the output DMA controller DMAC2$o$ is controlled so that each piece of pixel data from the plurality of multiply-accumulate units is arranged adjacently in one output bank OBK, which makes it possible to further shorten the processing time of the neural network engine.

Second Embodiment

<Details of Neural Network Engine>

Figure 6:
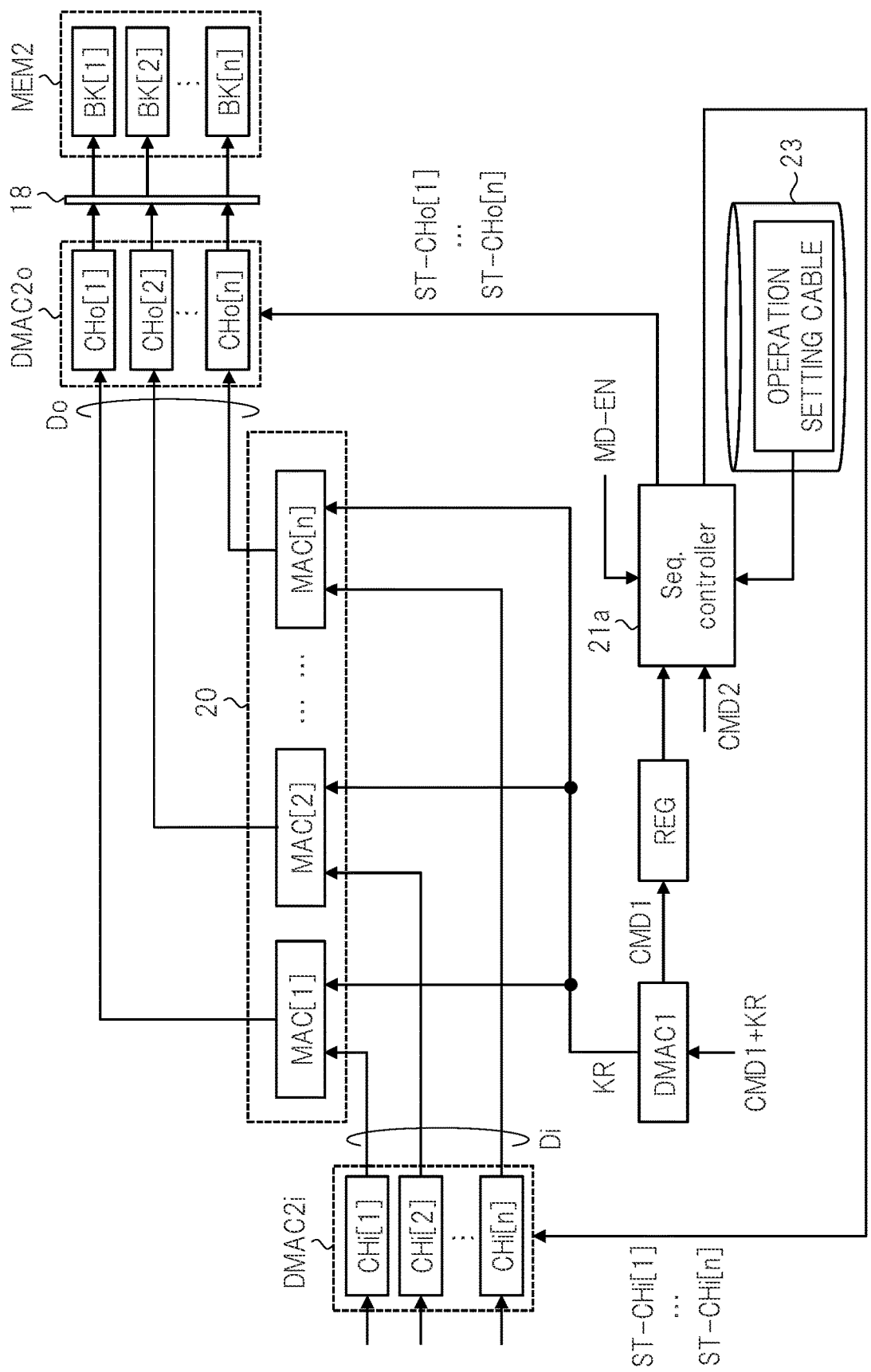
FIG. 6 is a diagram showing a detailed configuration example of the neural network engine in FIG. 1 in a semiconductor device according to a second embodiment.

FIG. 6 is a diagram showing a detailed configuration example of the neural network engine of FIG. 1 in a semiconductor device according to a second embodiment. A neural network engine 16 shown in FIG. 6 is slightly different from the configuration example shown in FIG. 2 in a configuration and an operation of a sequence controller 21$a$. The sequence controller 21$a$ inputs a command CMD1 from the register REG or a command CMD2 from the processor 17 as in the case of FIG. 2.

The commands CMD1, CMD2 include identifiers of one or more input banks IBK and identifiers of one or more output banks OBK. The sequence controller 21a determines one or more input channels based on the identifiers of the one or more input banks IBK. Then, the sequence controller 21a determines one or more input channels to be used for dispersion from the input channels other than the determined one or more input channels.

As a specific example, by the commands CMD1, CMD2, assumed is a case in which behaviors of setting the bank BK[1] as an input bank IBK and setting the bank BK[2] as an output bank OBK, and behaviors of setting the bank BK[3] as an input bank IBK and setting the bank BK[4] as an input bank IBK are instructed. In this case, the sequence controller 21a uniquely determines the two input channels CHi[1], CHi[3] based on the identifiers of the two banks BK[1], BK[3] that are the identifiers of the input bank IBK. Then, the sequence controller 21a determines the two input channels, which are used for dispersion, for example, Chi[2], Chi[4] out of the input channels excluding the two input channels CHi[1], CHi[3].

The sequence controller 21a also inputs an enable signal MD-EN determining whether a distribution mode, which is an operation mode shown in FIG. 4, is enabled or disabled. Here, for example, assumed is a case in which a command is inputted to set the bank BK[m] as an input bank IBK and the bank BK[k] as an output bank OBK. The sequence controller 21a causes the operation shown in FIG. 4 to be performed when the distribution mode is enabled, and the operation shown in FIG. 9 to be performed when the distribution mode is disenabled. Further, when the distribution mode is enabled, the sequence controller 21a determines setting contents of the input DMA controller DMAC2i and the output DMA controller DMAC2o based on an operation setting table 23 stored in advance.

FIG. 7 is a schematic diagram showing a configuration example of the operation setting table in FIG. 6. In the operation setting table 23 shown in FIG. 7, an input command and an operation setting content corresponding to the input command are registered in advance. For example, when a command for setting the bank BK[m] as the input bank IBK and setting the bank BK[k] as the output bank OBK is inputted, the sequence controller 21a outputs the setting signals ST-CHi[m], ST-CHi[j] to the input channel and the setting signals ST-CHo[m], ST-CHo[j] to the output channel based on the operation setting table 23.

FIG. 8 is a flow diagram showing an operation example of the sequence controller in FIG. 6. In FIG. 8, the sequence controller 21a inputs the commands CMD1, CMD2 (step S101). As a specific example, the sequence controller 21a inputs a command for setting the bank BK[m] as the input bank IBK and setting the bank BK[k] as the output bank OBK. Subsequently, the sequence controller 21a determines whether the distribution mode is enabled or disenable based on the enable signal MD-EN (step S102).

If the distribution mode is disabled in step S102 ("No"), the sequence controller 21a sets a normal operation (step S107). That is, as shown in FIG. 9, the sequence controller 21a causes the input channel CHi[m] to transfer, to the same multiply-accumulate unit MAC[m], the pixel data Di in the bank BK[m], which is the input bank IBK, for example, in the pixel space AR23 and the pixel data Di of the bank BK[m] in the next pixel space AR24. The sequence controller 21a also causes the output channel CHo[m] to transfer the pixel data Do23, Do24 from the multiply-accumulate unit MAC[m] to the bank BK[k] which is the output bank OBK.

If the distribution mode is enabled in step S102 ("Yes"), the sequence controller 21a refers to the operation setting table 23 by using the inputted command as a key (step S103), thereby determining whether the command is or not registered in the operation setting table 23 (step S104). If the command is not registered in the operation setting table 23 in step S104 ("No"), the sequence controller 21a sets a normal operation (step S107).

If the command is registered in the operation setting table 23 in step S104 ("Yes"), the sequence controller 21a determines an empty channel(s) in the input DMA controller DMAC2i and thus the output DMA controller DMAC2o (step S105). That is, the sequence controller 21a regards, as an empty, an input channel(s) excluding the uniquely determined input channel CHi[m] based on the input bank IBK, for example, the bank BK[m], and determines a dispersion input channel Chi[j] from among the empty input channels. Incidentally, when the input channel is determined, the multiply-accumulate unit and the output channel are also uniquely determined.

Then, the sequence controller 21a outputs setting signals to each of the input channels CHi[m], CHi[j] and each of the output channels CHo[m], CHo[j] based on the operation setting table 23 (step S106). Incidentally, in the example of FIG. 7, a command for specifying one input bank IBK and one output bank OBK is registered, but the command for specifying one input bank IBK and the two output banks OBK and the operation setting contents corresponding to them are registered, which also makes it possible to apply the distribution mode to the command.

<Main Effects of Second Embodiment>

As described above, also by using the method of the second embodiment, the same various effects as those described in the first embodiment can be obtained. Moreover, it is possible to cause the neural network engine 16 to operate in the distribution mode without providing a special command for the distribution mode to the processor 17 or the like. Furthermore, for example, it can be properly used that when a reduction in power consumption is desired, the distribution mode is disabled and when shortage of the processing time is desired, the distribution mode is enabled.

The invention made by the present inventor(s) has been specifically described above based on the embodiments. However, needless to say, the present invention is not limited to the above embodiments, and can be variously modified without departing from the scope of the invention.

What is claimed is:
1. A semiconductor device comprising:
a memory having n banks accessible in parallel and storing pixel data, where n is an integer of 2 or more;
n multiply-accumulate units, each of the multiply-accumulate units performing a multiply-accumulate operation on a plurality of pieces of pixel data and a plurality of weight parameters;
an input DMA (Direct Memory Access) controller respectively transferring the pixel data stored in the memory to the n multiply-accumulate units by using n input channels;
an output DMA controller respectively transferring the pixel data from the n multiply-accumulate units to the memory by using n output channels; and
a sequence controller controlling the input DMA controller and the output DMA controller, wherein when any one of the n banks is set as an input bank and any two of the n input channels are set as a first input channel and a second input channel and the multiply-accumulate units which are transfer destinations of the first input channel and the second input channel are respectively set as a first multiply-accumulate unit and a second multiply-accumulate unit, the sequence controller controls the input DMA controller so as to cause the first input channel to transfer the pixel data in a first pixel space of the input bank to the first multiply-accumulate unit and cause the second input channel to transfer the pixel data in a second pixel space of the input bank to the second multiply-accumulate unit.

2. The semiconductor device according to claim 1,
wherein when any other one of the n banks is set as an output bank and the output channels which use the first multiply-accumulate unit and the second multiply-accumulate unit as transfer sources are respectively set as a first output channel and a second output channel, the sequence controller controls the output DMA controller so as to cause the first output channel to transfer the pixel data from the first multiply-accumulate unit to the output bank and cause the second output channel to transfer the pixel data from the second multiply-accumulate unit to the output bank.

3. The semiconductor device according to claim 2,
wherein the second pixel space is a pixel space obtained by sliding the first pixel space once, and
wherein the sequence controller controls the output DMA controller so that the pixel data from the first output channel and the pixel data from the second output channel are arranged adjacently on an address space of the output bank.

4. The semiconductor device according to claim 1,
wherein the sequence controller inputs a command containing an identifier or identifiers of the one or more input banks, determines the one or more first input channels based on the identifier or identifiers of the one or more input banks, and determines the one or more second input channels from among the input channels excluding the one or more first input channels.

5. The semiconductor device according to claim 1,
wherein the sequence controller inputs a command containing an identifier of the input bank and an enable signal that determines whether a distribution mode is enabled or disabled,
wherein when the distribution mode is enabled, the sequence controller causes the first input channel to transfer the pixel data in the first pixel space of the input bank to the first multiply-accumulate unit and causes the second input channel to transfer the pixel data in the second pixel space of the input bank to the second multiply-accumulate unit, and
wherein when the distribution mode is disabled, the sequence controller causes the first input channel to transfer the pixel data in the first pixel space and the pixel data in the second pixel space of the input bank to the first multiply-accumulate unit.

6. A semiconductor device configured by one semiconductor chip, the semiconductor device comprising:
a neural network engine performing a processing of a neural network;
a first memory storing a weight parameter;
a second memory having n banks accessible in parallel and storing pixel data, where n is an integer of 2 or more;
a processor;
a system bus interconnecting the neural network engine, the first memory, and the processor; and
a memory bus connecting the neural network engine and the second memory,
wherein the neural network engine includes:
  n multiply-accumulate units, each of the multiply-accumulate units performing a multiply-accumulate operation on a plurality of pieces of pixel data and a plurality of weight parameters;
  a first DMA (Direct Memory Access) controller transferring the weight parameters stored in the first memory to the n multiply-accumulate units;
  a second input DMA controller respectively transferring the pixel data stored in the second memory to the n multiply-accumulate units by using the n input channels;
  a second output DMA controller respectively transferring the pixel data from the n multiply-accumulate units to the second memory by using the n output channels; and
  a sequence controller controlling the second input DMA controller and the second output DMA controller,
wherein when any one of the n banks is set as an input bank and any two of the n input channels are set as a first input channel and a second input channel and the multiply-accumulate units which are transfer destinations of the first input channel and the second input channel are respectively set as a first multiply-accumulate unit and a second multiply-accumulate unit, the sequence controller controls the input DMA controller so as to cause the first input channel to transfer the pixel data in a first pixel space of the input bank to the first multiply-accumulate unit and cause the second input channel to transfer the pixel data in a second pixel space of the input bank to the second multiply-accumulate unit.

7. The semiconductor device according to claim 6,
wherein when any other one of the n banks is set as an output bank and the output channels which use the first multiply-accumulate unit and the second multiply-accumulate unit as transfer sources are respectively set as a first output channel and a second output channel, the sequence controller controls the output DMA controller so as to cause the first output channel to transfer the pixel data from the first multiply-accumulate unit to the output bank and cause the second output channel to transfer the pixel data from the second multiply-accumulate unit to the output bank.

8. The semiconductor device according to claim 7,
wherein the second pixel space is a pixel space obtained by sliding the first pixel space once, and
wherein the sequence controller controls the output DMA controller so that the pixel data from the first output channel and the pixel data from the second output channel are arranged adjacently on an address space of the output bank.

9. The semiconductor device according to claim 6,
wherein the sequence controller inputs a command containing an identifier of identifiers of the one or more input banks, determines the one or more first input channels based on the identifier or identifiers of the one or more input banks, and determines the one or more second input channels from among the input channels excluding the one or more first input channels.

10. The semiconductor device according to claim 6,
wherein the sequence controller inputs a command containing an identifier of the input bank and an enable signal that determines whether a distribution mode is enabled or disabled,
wherein when the distribution mode is enabled, the sequence controller causes the first input channel to transfer the pixel data in the first pixel space of the input bank to the first multiply-accumulate unit and causes the second input channel to transfer the pixel data in the second pixel space of the input bank to the second multiply-accumulate unit, and
wherein when the distribution mode is disabled, the sequence controller causes the first input channel to transfer the pixel data in the first pixel space and the pixel data in the second pixel space of the input bank to the first multiply-accumulate unit.

* * * * *